July 1, 1930.  G. T. GWATHMEY, JR  1,768,597
EYE PROTECTOR
Filed Sept. 28, 1927
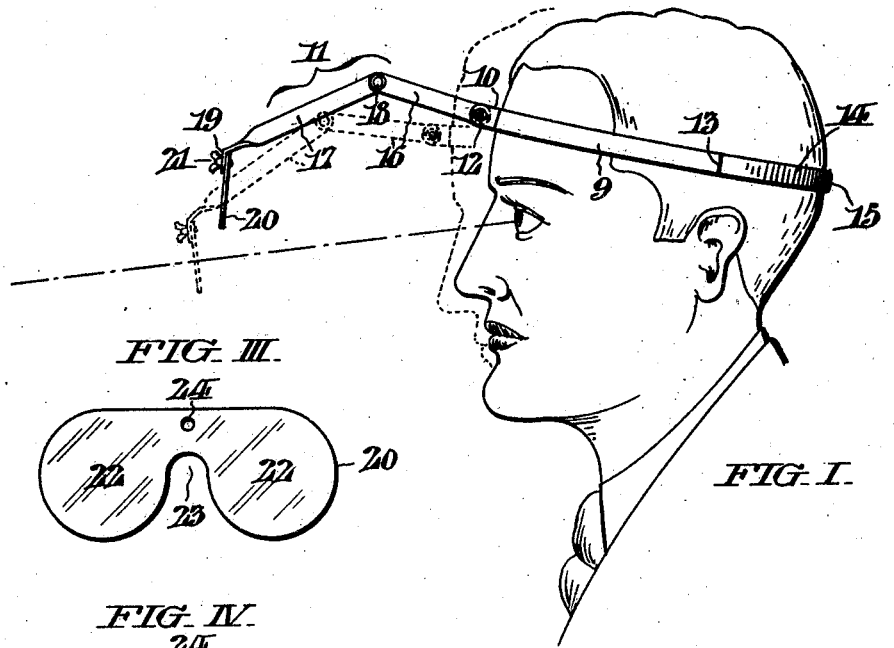
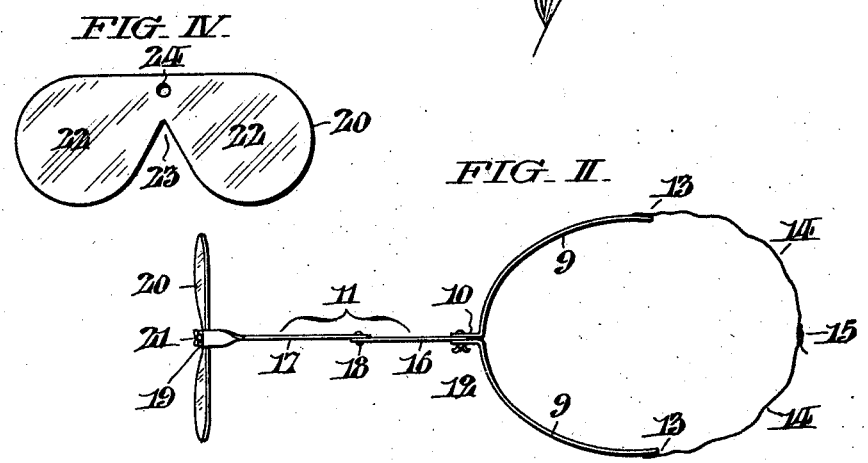
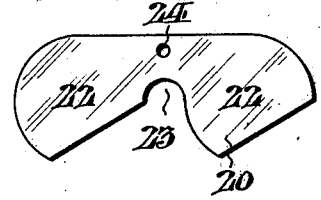
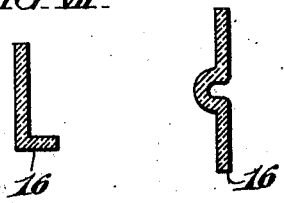
WITNESSES
INVENTOR:
George Tayloe Gwathmey, Jr.
BY
ATTORNEYS.

Patented July 1, 1930

1,768,597

UNITED STATES PATENT OFFICE

GEORGE TAYLOE GWATHMEY, JR., OF NORFOLK, VIRGINIA

EYE PROTECTOR

Application filed September 28, 1927. Serial No. 222,624.

This invention relates to protectors for the eyes—more particularly to a type commonly known as a "glareshield" for use by motorists and others to counteract the headlight glare of approaching vehicles at night, or as a means to filter strong sunlight in daytime and thereby obviate its temporary blinding action.

Primarily I aim to provide an eye protecting device, adaptable either to the user's head or headwear, which embodies a protective shield that is automatically placed before the wearer's eyes by a slight inclination or nod of the head, and by a similar movement removable out of the normal "zone of attention" as differentiating from the field of vision.

This invention further contemplates a device of the specified character which includes a light filtering element, so configured and positionally adjustable relative to the eyes, as to afford free visibility to the right and left hand for both eyes.

Another object of the invention is to provide a novel eye protector which, while particularly adapted for use by motorists, may be readily adapted for use by theater patrons and others in lieu of opera glasses.

In addition to the foregoing this invention comprehends improvements in the details of construction and arrangement of parts, to be hereinafter fully described and particularly pointed out in the appended claims.

Briefly stated, my invention comprises a flexible or articulated member with means, at one end, for variably sustaining a light filtering element; and, at the other end, a relatively adjustable means whereby the device is supported on the head, or by the user's cap or hat.

In the drawings, Fig. I is a view illustrative of my novel eye protector as applied to the user's head with the light filtering shield shown raised out of the line of vision in full lines, and in the active or eye-shielding position by dotted lines.

Fig. II is a plan view of the device.

Fig. III is a face view of the light filtering shield.

Fig. IV is a similar view of a modified form thereof.

Fig. V illustrates a further variation in the shape of the light filtering shield.

Figs. VI, VII and VIII are detail sections, later referred to.

The embodiment of my invention herein shown comprises opposed flexible bands or perforate strips 9, 9, of light metal conveniently shaped to fit the forehead, and formed with closely adjoining ears forwardly directed at 10, for intimate grippage therebetween of one end of the proximal part of an articulated bar or jointed member 11, through the medium of a conventional clamping screw 12. Attached at 13 to the rear ends of the bands 9, 9 are straps 14 which are adjustably connectible together by a suitable buckle 15.

The articulated bar or jointed member 11 comprises flat strips 16, 17, which are connected together at 18 for relative inclination. The forward or distal section 17 is twisted through a right angle and directed downwardly at an angle to provide an inclined support 19, to which the light filtering shield 20 is secured with capacity for adjustment, by means of a clamping screw 21. The shield 20 is thus sustained transversely of the line of vision indicated by dots and dashes in Fig. I, at a suitable distance forward of the eyes. The joint 18 is of a character—or embodies means—effective to maintain constant degree of friction. Consequently, when the sections 16, 17 are relatively inclined as shown, their degree of angular adjustment is rigidly maintained, unless force is applied to disturb the same. It is of course obvious that I may employ other joints at 12, 18 and 21, such as the conventional ball-and-socket type common to physician's mirror-supporting head sets etc.; or, I may use a length of flexible metallic tubing in place of the articulated member 11, as will likewise be well understood by those conversant with the art. The members 16, 17 of the articulated bar 11 may be made from material having either of the cross-sectional configurations shown in Figs. VI, VII or VIII.

The light-filtering shield 20 may be of the form shown in either Fig. III, IV or V, that is to say, it is of a contour to effectively shade both of the wearer's eyes, and embodies two substantially circular lens portions 22 of restricted area with a liberal intervening cut-out 23, as well as a small central aperture 24 for the clamp screw 21 by which it is secured to the section 17 of the articulated member 11. The shield 20 may be made of colored celluloid, tinted glass, or any other transparent material adapted to light filtration. The shield 20 can moreover be standardized for general use, or made to suit individuals with eyes very far apart, or close together, its removability enabling easy interchanging.

From the foregoing it will be apparent that when my eye protector is placed firmly upon the head, or secured to the crown of a hat or cap, with the light filtering shield 20 positioned about six inches in advance of the eyes—for example, that I have provided an efficient glare arresting device, capable of universal or substantially universal adjustment. The device can initially be adjusted and fixed relative to the eyes so that a slight movement, or inclination of the head, will suffice to move it into the line of vision whereby access of artificial glare or strong sunlight is instantly cut-off; and, vice versa, normal vision being restored by a reverse head motion. When my novel eye protector is applied to a hat or cap, by provision of the friction joint 18, I am enabled to collapse or fold back the light shield 20 toward the crown of said hat or cap; or, when on the head as shown—upwardly toward the forehead, and thereby temporarily suspend its use. Somewhat similarly, when the device is not in use, the light shield 20 may be folded in between the bands 9, 9 and thereby afforded adequate protection from accidental damage. It will further be seen that the joint 18 in the articulated member 11 readily accommodates and adapts itself to the upwardly curled brims of different styles of hats, while freely permitting the parts 9, 14, to encircle the crown thereof. Moreover, by provision of the joints 12, 18 the level of the light shield 20 relative to the eyes, on extended tours, may be easily changed, with resultant prevention of cramping of the neck and the shoulder muscles.

It is to be particularly noted that by virtue of the novel shaping of the light shield 20 with the interval 23 between its component lenses 22, direct vision is possible laterally so that the driver may plainly see the sides of the road.

Having thus described my invention, I claim:

1. An eye protector of the character described comprising a curved band of opposing pivotally-connected components with means for attachment to the wearer's head, a light shield, and a member affording rigid support for the light shield transversely of the line of vision in advance of the eye, said member being foldably-articulated to the curved band aforesaid.

2. An eye protector of the character described comprising a head attachment, a light filtering shield, and a two-part longitudinally-flexible member extending centrally forward from the head attachment to support the light shield transversely of the line of vision at proper focus in front of the eyes, said member including friction means for its rigid maintenance at the requisite focus and being foldable for accommodation—together with the light shield—within the confines of the head attachment.

3. An eye protector of the character described comprising a head attachment in the form of a curved flexible band, a light shield, and an articulated member to rigidly support the light shield transversely of the line of vision at a distance in front of the eyes, said member having pivotal connection centrally of the frontal portion of the head band so as to be foldable into the area within the latter together with the light shield.

4. An eye protector of the character described comprising a head attachment formed by a pair of complementarily-curved flexible bands, a light shield, and an articulated member to rigidly support the light shield transversely of the line of vision at a distance in front of the eyes, said member also having pivotal connection at its juncture with the head bands so as to be foldable into the space between said bands together with the light shield.

5. In an eye protector of the character described the combination of a head attachment, a light filtering shield, and a two-part articulate member pivoted to and extending forwardly from the center of the head attachment to rigidly support the shield transversely of the line of sight at a distance in front of the eyes, said shield being clampingly attached to the distal part of the articulate member and embodying lenses of restricted area with a liberal interval therebetween permitting direct sidewise vision.

In testimony whereof, I have hereunto signed my name at Philadelphia, Pennsylvania, this 16th day of September, 1927.

GEORGE TAYLOE GWATHMEY, Jr.